(12) United States Patent
Sawatzky et al.

(10) Patent No.: US 8,676,045 B1
(45) Date of Patent: Mar. 18, 2014

(54) STUDIO ARRANGEMENT

(75) Inventors: Jeremy David Sawatzky, Seattle, WA (US); Christina L. Porter, Seattle, WA (US); Jeff Strauss, Burlington, KY (US); Gil Blank, Morris Plains, NJ (US)

(73) Assignee: Amazon Technologies, Inc., Reno, NV (US)

( * ) Notice: Subject to any disclaimer, the term of this patent is extended or adjusted under 35 U.S.C. 154(b) by 119 days.

(21) Appl. No.: 13/292,359

(22) Filed: Nov. 9, 2011

(51) Int. Cl.
*G03B 15/00* (2006.01)
*G03B 15/02* (2006.01)
*H04N 5/222* (2006.01)

(52) U.S. Cl.
USPC ........................ 396/3; 396/4; 396/5

(58) Field of Classification Search
USPC .......................... 396/1–5; 348/722
See application file for complete search history.

(56) References Cited

U.S. PATENT DOCUMENTS

2003/0206735 A1* 11/2003 Saigo et al. .................. 396/1

* cited by examiner

*Primary Examiner* — Rochelle-Ann J Blackman
(74) *Attorney, Agent, or Firm* — Thomas | Horstemeyer, LLP

(57) ABSTRACT

Disclosed are various embodiments of a studio arrangement and a method of capturing images and/or video. One embodiment of the disclosure includes a front light source aimed at a background, an image capture position located between the background and the front light source, an elevated platform positioned between the image capture position and the background, and at least one rear light source positioned between the elevated platform and the background. A subject can be photographed and/or filmed on the elevated platform to achieve a desired effect of a substantially seamless background where a rear edge of the elevated platform is imperceptible to an image capture device positioned at the image capture position.

27 Claims, 3 Drawing Sheets

STUDIO ARRANGEMENT

BACKGROUND

Items are often photographed and/or filmed in a studio environment and the resultant images and/or video rendered on a display device associated with a computing device. The resultant images and/or video can also be used as promotional and/or informational collateral associated with the items, which is also viewed on a display device. Post-processing or retouching of images and/or video captured in a studio environment can be time consuming and/or resource intensive, particularly when a consistent look and feel is desired and the items photographed in the studio environment are non-uniform.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the disclosure are directed to an arrangement of various elements to form a studio in which items, people, products, clothing, or any other objects can be photographed and/or filmed to achieve a particular effect. More specifically, embodiments of the disclosure can allow images and/or video of an item placed in a studio arrangement as described herein to be captured with a background that appears, when captured with an image capture device, as a near perfect white without the need for post-processing, retouching, or other image manipulation. In other words, images and video of items captured in the studio arrangement appear against a background that is equivalent to a white background when converted into a web color hexadecimal triplet corresponding to a true white. A hexadecimal triplet corresponding to a true white according to various browser standards, such as hypertext markup language (HTML), cascading style sheets (CSS), and other standards, can be represented by three bytes corresponding to a red parameter, a green parameter, and a blue parameter, each with a maximum value of 255. Additionally, embodiments of the disclosure also achieve an effect, without any image manipulation, of an object photographed and/or filmed in the studio arrangement that appears to be floating in front of the true white background with a reflection of the object appearing beneath the object.

Prior art solutions for achieving such a result for capturing images and/or video of objects set against a true white background include solutions that often involve some type of image retouching, post processing, "green screen" techniques, or other special effects and image and video manipulation to achieve the result of an object set against a true white background. Accordingly, as will be described herein, embodiments of the present disclosure provide a studio arrangement in which an object can be photographed and/or filmed, and the images and/or video captured by the camera achieve the effect noted above without any image manipulation due to the particular arrangements of the subject, camera, lighting and background.

Figure 1:
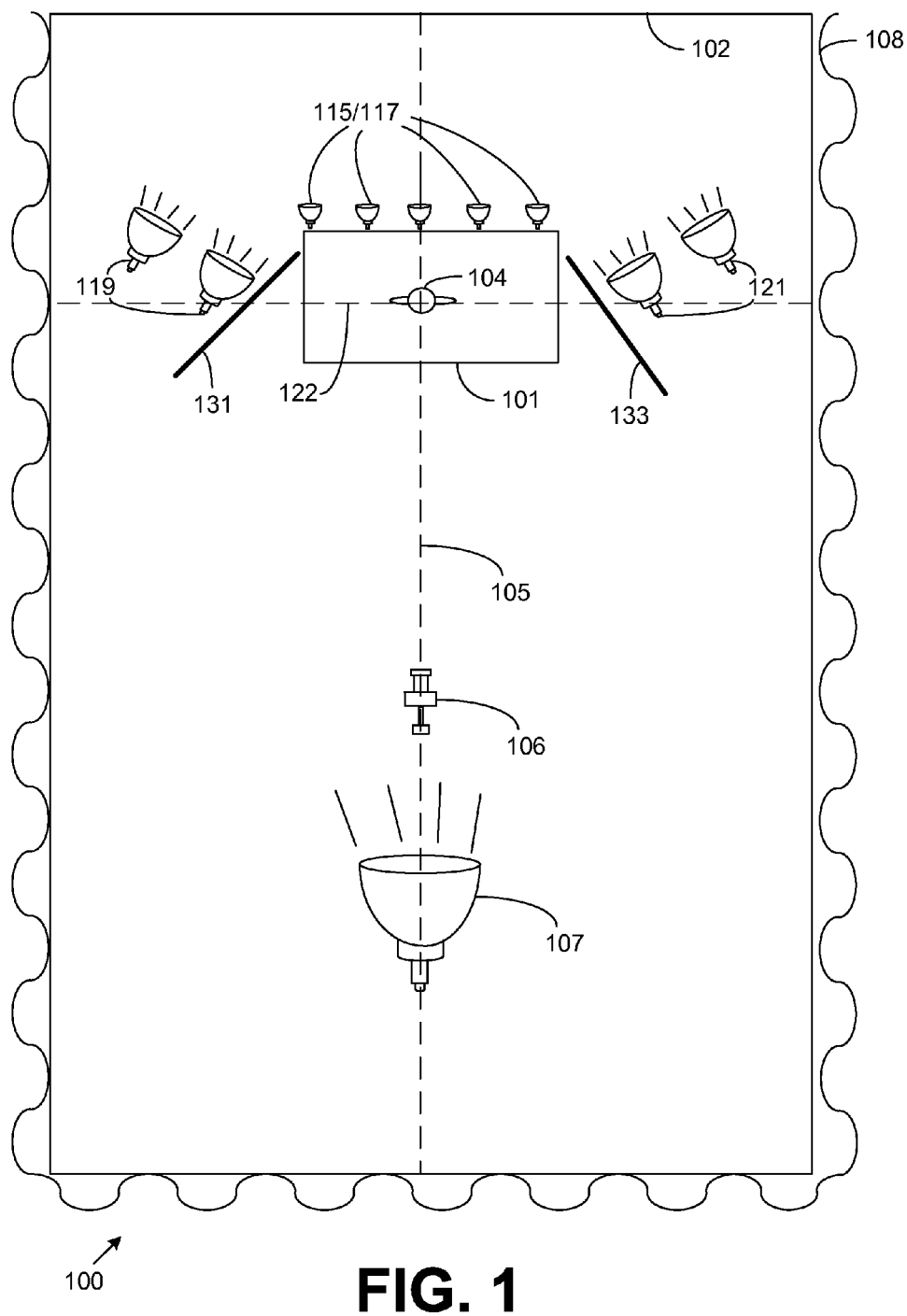
FIG. 1 is a top view of a studio arrangement according to various embodiments of the present disclosure.
Figure 2:
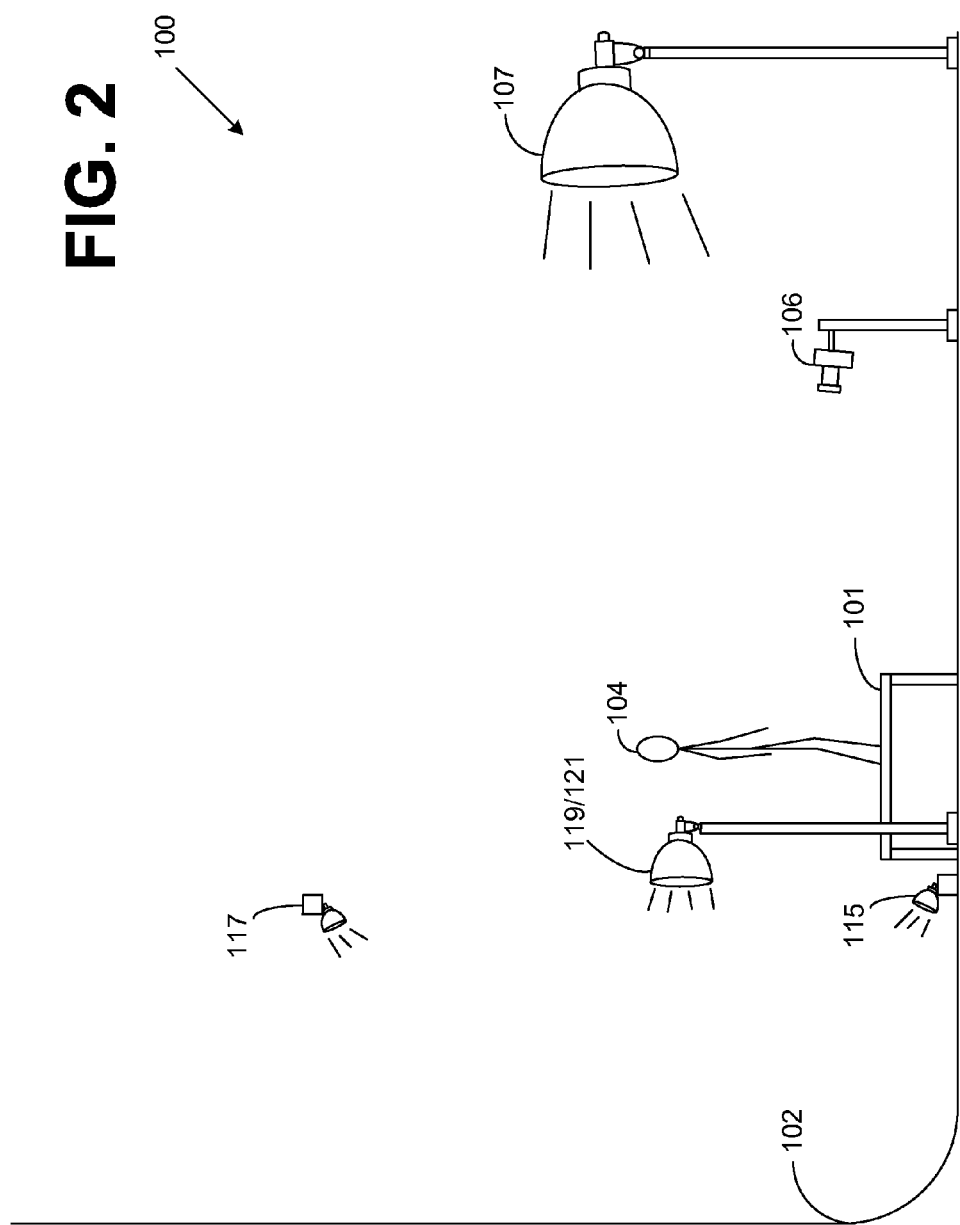
FIG. 2 is a side view of the studio arrangement of FIG. 1 according to various embodiments of the present disclosure.

With reference to FIGS. 1-2, shown is a studio arrangement 100 according to various embodiments. FIG. 1 illustrates a top plan view of a studio arrangement 100 according to an embodiment of the disclosure, and FIG. 2 illustrates a side view of the studio arrangement 100. As shown in FIG. 1, the studio arrangement 100 also includes an elevated platform 101 on which a subject 104 can be positioned and be photographed and/or filmed in front of a background 102. A subject 104 can comprise a model, product, or any object desired to be photographed and/or filmed in the studio arrangement 100 as appearing on a true white background. The elevated platform 101 is configured with a top surface made of a material that can include, but is not limited to a plastic, such as Poly (methyl methacrylate), which is commonly known as "plexiglass," and/or any other materials that possess a degree of transparency as well as reflectivity. Such a material produces an effect in images and/or video of the subject 104 such that a reflection of the subject 104 appears beneath the subject 104, but where the top surface of the elevated platform 101 blends seamlessly into a true white background.

Additionally, light reflecting off the background 102 and into an image capture device positioned in the appropriate position in the studio arrangement 100 causes the top surface of the elevated platform 101 to likewise have a true white appearance. Also, a rear edge of the elevated platform also appears imperceptible or not visible to the image capture device due to the positioning, configuration, and orientation of the various elements in the studio arrangement 100 as described below. It should be appreciated that a background 102 of any color may be chosen and due to the positioning of the various elements in the studio arrangement 100, light emanating from the background 102 reflects off of the top surface of the elevated platform 101, into an image capture device positioned according to the disclosure, and causes the top surface of the elevated platform 101 to appear the same color as the background 102.

The elevated platform 101 can be positioned approximately nine feet from the background 102, as measured from the center of the elevated platform 101, in a longitudinal axis 105 that intersects the elevated platform 101 and the background 102. A top surface of the elevated platform 101 is also elevated approximately twenty-one inches above the floor of the studio arrangement 100 and has a depth of approximately four feet. In other words, the elevated platform 101 is positioned at a distance that is about 4.5-5.5 times the height of the top surface of the elevated platform 101 from the floor of the studio arrangement 100.

The studio arrangement 100 also includes one or more rear light sources aimed at the background and oriented in a particular manner that will be described herein. At least a portion of the one or more rear light sources is positioned between the background 102 and the elevated platform 101 and intersects the longitudinal axis 105. The studio arrangement also includes an image capture position 106 with an image capture device that is positioned between the elevated platform 101 and a front light source 107 aimed at the elevated platform 101 as well as the background 102.

The image capture position 106 and the front light source 107 are also positioned so that at least a portion of each intersects the longitudinal axis 105. As depicted in FIG. 2, the background 102 can comprise a cyclorama, or a curve, concave background. The use of a cyclorama as the background 102 prevents an intersection of the floor and back wall of the studio arrangement 100 from being visible in images and/or video captured of the subject 104. The background 102 also comprises a substantially white background, or one that can be characterized by a hexadecimal triplet substantially corresponding to a true white according to various browser standards as described above. An outer light shield 108, such as curtains, a wall, and/or any type of light barrier, can also enclose the studio arrangement 100 to prevent ambient light from entering and altering the lighting conditions within the studio arrangement 100.

The one or more rear light sources can be arranged in various angular orientations and positions within the studio arrangement 100. In one embodiment, the one or more rear light sources can comprise a plurality of light sources aimed at the background 102 and away from the subject 104 such that a total of approximately forty kilowatts of tungsten light sources having a color temperature of about 3200 kelvin (K) are substantially evenly distributed across at least a portion of the background 102 that is visible in images and/or video captured of the subject 104. The arrangement of a plurality of rear light sources depicted in FIGS. 1-2 illustrate one example of an arrangement of light sources configured to approximately meet the above parameters. It should be appreciated that various arrangements and positioning of light sources can be chosen to meet the parameters of forty kilowatts of light sources aimed at the background 102 in a substantially even distribution.

In the example illustrated in FIGS. 1-2, the one or more rear light sources can comprise a first rear light source 115 and a second rear light source 117 positioned adjacent to and behind the elevated platform 101. Referring to the side view of the studio arrangement 100 of FIG. 2, the first rear light source 115 and second rear light source 117 are vertically offset from one another. The first rear light source 115 is positioned on or near a floor of the studio arrangement 100 and aimed at the background 102. The first rear light source 115 can be oriented at an upward forty-five degree angle (or other appropriate angle) relative to the floor. The second rear light source 117, as depicted in FIG. 2, is positioned above the elevated platform 101 and aimed at the background. The second rear light source 117 can be oriented at a downward forty-five degree angle (or other appropriate angle) relative to the floor. In one embodiment, the second rear light source 117 is positioned approximately one hundred ninety nine inches above the floor of the studio arrangement 100. In other words, the second rear light source 117 can be positioned at a height that is approximately 1.5-2.5 times the distance of the elevated platform 101 from the background 102.

The first rear light source 115 and second rear light source 117 are positioned so that at least a portion of each is located within or near the longitudinal axis 125. In one embodiment, the first rear light source 115 and second rear light source 117 can comprise one or more light sources that respectively total ten kilowatts of light sources directed at the background 101. In the depicted example, the first rear light source 115 and second rear light source 117 each comprise an array of five two kilowatt tungsten studio lighting emitting light having a color temperature of approximately 3200K.

The studio arrangement 100 also includes a third rear light source 119 and a fourth rear light source 121. In one embodiment, the third rear light source 119 and fourth rear light source 121 comprise ten kilowatt light sources positioned on opposing sides of the elevated platform 101 that are aimed at the background. In the depicted embodiment, the third rear light source 119 and fourth rear light source 121 are positioned such that at least a portion of each intersects or is near a lateral axis 122 intersecting the elevated platform 101. The third rear light source 119 and fourth rear light source 121, in some embodiments can also be positioned behind and laterally offset from the elevated platform 101 so long as they are aimed at the background 102.

As shown in FIG. 1, the third rear light source can comprise 119 two five kilowatt tungsten studio lighting emitting light having a color temperature of approximately 3200K. Similarly, the fourth rear light source 121 two five kilowatt tungsten studio lighting sources emitting light having a color temperature of approximately 3200K. In the depicted embodiment, for each of the third rear light source 119 and fourth rear light source 121, one of the five kilowatt studio lighting sources can be positioned approximately sixty-six inches from the background, and another can be positioned approximately seventy-eight inches from the background. In other words, these light sources can be positioned such that they are located a distance that is in a range of about 0.5-1.0 times the distance that the elevated platform 101 is located from the background 102. The third rear light source 119 and fourth rear light source 121 are also oriented at an approximately forty-five degree angle relative to the longitudinal axis 125.

Additionally, the studio arrangement 100 includes a first light shield 131 and second light shield 133 that are positioned between elevated platform 101 and the third rear light source 119 and fourth rear light source 121, respectively. The first light shield 131 and second light shield 133 are configured to prevent light emanating directly from the third rear light source 119 and fourth rear light source 121 an onto the elevated platform 101 and/or the subject 104 positioned on the elevated platform 101. Accordingly, the first light shield 131 and second light shield 133 can comprise an opaque barrier that prevents light from being emitted from the third rear light source 119 and fourth rear light source 121 to the elevated platform 101.

As shown in FIGS. 1-2, the studio arrangement 100 also comprises a front light source 107 aimed at the elevated platform 101, the subject 104, and the background 102. The front light source 107 can comprise a twelve kilowatt studio lighting source emitting light with a color temperature of approximately 3200K. The front light source is positioned, in the depicted example, approximately six feet rearward of the image capture position 106 at a height of approximately eighty-four inches relative to the floor of the studio arrangement 100, or a height that is approximately two to three times the height of the top surface of the elevated platform 101 and is oriented at a downward angle of approximately five degrees relative to the floor.

The image capture position 106 is the location in the studio arrangement 100 where an image capture device can be positioned for image and/or video capture such that the desired effect described above is realized. An image capture device can be stationed at the image capture position 106, which is positioned approximately nineteen feet from the rear of the elevated platform 101, or at a distance from the elevated platform 101 that is about two to 2.5 times the distance that the elevated platform 101 is positioned from the background 102. Accordingly, the front light source 107 is positioned at a distance from the elevated platform 101 that is about two to three times the distance that the elevated platform 101 is positioned from the background 102. The image capture position 106 is also positioned at a height that is about two to 2.5 times the height of the top surface of the elevated platform 101. The image capture device can be oriented at an upward five degree angle relative to the floor of the studio arrangement 100. Additionally, to achieve the desired effect, an image capture device can be positioned at a shooting distance from the subject 104 of approximately seventeen feet (in the case of an object placed in the middle of the elevated platform 101), at a distance that is about twice the distance that the elevated platform 101 is positioned from the background 102 and equipped with an eighty five millimeter lens and configured with an International Standards Organization (ISO) film speed setting of approximately 320 and an aperture setting f-stop parameter of approximately 5.6.

Although one specific implementation of an embodiment of the disclosure is disclosed herein, it should be appreciated that the desired effect can be achieved by employing one or more rear light sources and one or more front light where the ratio of the intensity of the rear light sources to the front light source is approximately 10:3. For example, in an alternative embodiment, rear light sources totaling four kilowatts and a front light source that is 1.2 kilowatts can also be employed, provided that the dimensions and distances of the various elements in the studio arrangement 100 relative to one another are correspondingly adjusted. Additionally, it is not necessary that tungsten lighting emitting light having a color temperature of 3200K are employed as the rear light sources and front light source so long as the color temperature of the various light sources are the same or similar.

Accordingly, an image and/or video captured in the above studio arrangement 100 with the above noted illustrative parameters can achieve the desired effect of a true white background. Because of the use of a cyclorama as the background 102, an intersection of a wall and floor is not visible, as no such intersection exists. Additionally, the intensity and positioning of the one or more rear light sources relative to the elevated platform 101 and the background 102 achieves a substantially even distribution of light across at least a portion a background 102 visible in an image and/or video captured at the image capture position 106. The reflection of the substantially even distribution of a total of forty kilowatts of the rear light sources from the white background 102 cause the top surface of the elevated platform 101 to have a true white appearance. Additionally, the rear light sources in combination with the twelve kilowatt front light source 107 causes the rear edge of the elevated platform 101 to effectively be invisible or imperceptible in a captured image and/or video. Additionally, this combination of the elevated platform 101, the described lighting and the background 102 cause a reflection of the subject 104 to appear on a true white background. In other words, the subject 104 appears as if the subject 104 is floating in front of a true white background 104 and above a true white and slightly reflective surface without any image manipulation, retouching, special effects, or any other image post-processing.

Accordingly, images captured by an image capture device positioned at the image capture position 106 can be published, without any post-processing, and rendered by a browser in a web page, by a mobile application, image viewer, or any other means for viewing imagery and achieve the desired effect.

Figure 3:
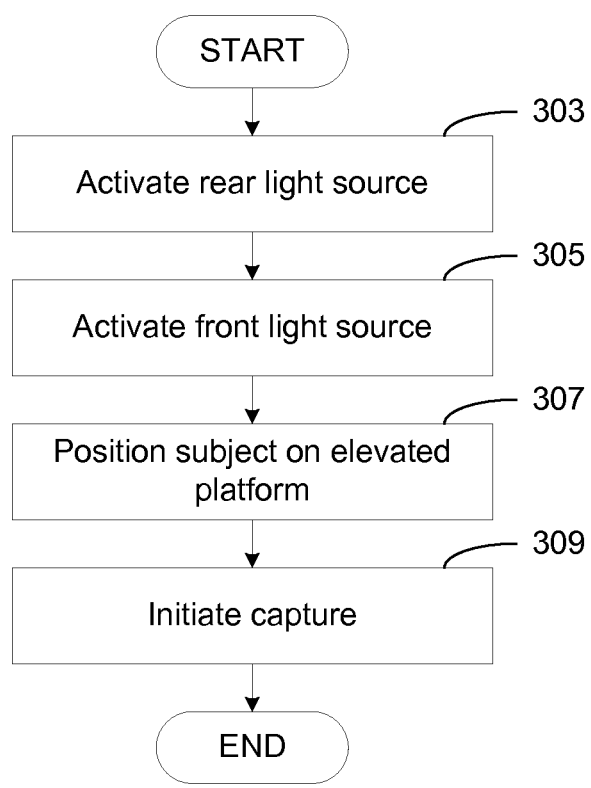
FIG. 3 is a flowchart illustrating a method of capturing an image in the studio arrangement of FIGS. 1-2 according to various embodiments of the present disclosure.

Referring next to FIG. 3, shown is a flowchart that provides one example of a method of using the studio arrangement 100 (FIG. 1) according to various embodiments. It is understood that the flowchart of FIG. 3 provides merely an example of the various ways in which a studio arrangement 100 according to the present disclosure can be employed to capture images and/or video of a subject 104 (FIG. 1) to achieve the desired effect described above.

In step 303, the one or more rear light sources can be activated. As described above, the one or more rear light sources can comprise a plurality of light sources such that about forty kilowatts of tungsten studio lighting emitting light with a color temperature of approximately 3200K is evenly distributed across a portion of the background 102. In step 305, the front light source can be activated, which illuminates the subject 104 on the elevated platform 101 with about twelve kilowatts of tungsten studio lighting emitting light with a color temperature of approximately 3200K. In other words, a ratio of the rear light sources to the front light source can be approximately 10:3. In step 307, the subject 104 can be positioned on the elevated platform 101 (FIG. 1). As noted above, the subject 104 can include people, products, or any object desired to be photographed or filmed in the studio arrangement 100 to achieve the desired effect. In step 309, images and/or video of the subject can be captured with an image capture device from the image capture position 106 to achieve the desired effect described above.

It should be noted that angles, dimensions, distances, settings, parameters, and other numerical data may or may not be expressed herein in a range format. It is to be understood that the numerical data is presented herein and used for convenience and brevity, and thus, should be interpreted in a flexible manner to include not only the numerical values explicitly recited as the only workable parameters, but also to include all the individual numerical values that can be employed in a studio arrangement 100 to achieve the desired effect discussed herein. To illustrate, a distance expressed as "six feet" should be interpreted to distances that are within a reasonable range of such a distance or may vary significantly provided other parameters compensate to achieve desired effects. Additionally, it should also be understood that embodiments of the disclosure can also include equivalent arrangements of elements in a studio that can also achieve a desired effect. For example, while a particular non-limiting example of parameters related to studio lighting may be recited, these parameters can be varied to achieve the desired effect by modulating a distance in combination with the wattage and/or color temperature of the studio lighting to achieve an equivalent result. All such variations are intended to be within the scope of the present disclosure. In embodiments of the disclosure, terms such as "about," "approximately," and "substantially" can include traditional rounding according to significant figures of the numerical value.

It should be also noted that numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a distance range of "one feet to two feet" should be interpreted to include not only the explicitly recited range, but also include individual distances (e.g., 1.2 feet, 1.3 feet, etc.) and sub-ranges within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A studio arrangement, comprising:

a background comprising a white cyclorama;

a front light source positioned in a longitudinal axis intersecting the background, the longitudinal axis further being substantially perpendicular to a surface of the white cyclorama;

an image capture position located between the background and the front light source in the longitudinal axis, the image capture position comprising at least one image capture device equipped with an eighty-five millimeter lens, the at least one image capture device further configured with an ISO setting of about three hundred twenty and an f-stop value of about 5.6;

an elevated platform positioned between the image capture position and the background in the longitudinal axis, the front light source being directed toward a subject on the elevated platform;

a first rear light source aimed at the background and positioned between the elevated platform and the background in the longitudinal axis, the first rear light source positioned below a top surface of the elevated platform and oriented at an upward angle relative to a floor level;

a second rear light source aimed at the background and positioned between the elevated platform and the background in the longitudinal axis, the second rear light source positioned above the top surface of the elevated platform and oriented at a downward angle relative to the floor level;

a third rear light source aimed at the background and positioned in a lateral axis intersecting the elevated platform and being substantially perpendicular to the longitudinal axis, the third rear light source further positioned adjacent to a side of the elevated platform; and a fourth rear light source aimed at the background and positioned in the lateral axis adjacent to an opposing side of the elevated platform relative to the third rear light source; wherein a top surface of the elevated platform reflects light emanating from the background such that the elevated platform appears white and a rear edge of the elevated platform is substantially imperceptible to the image capture device; and the first rear light source, the second rear light source, the third rear light source, and the fourth rear light source comprise a combined intensity greater than the front light source according to about a 10:3 ratio.

2. A studio arrangement, comprising:

a background comprising a cyclorama;

a front light source positioned in a longitudinal axis intersecting the background, the longitudinal axis further being substantially perpendicular to a surface of the background;

an image capture position located between the background and the front light source in the longitudinal axis;

an elevated platform positioned at a first distance from the elevated platform and between the image capture position and the background along the longitudinal axis, the front light source being directed toward the elevated platform;

a first at least one rear light source positioned between the elevated platform and the background, the at least one rear light source directed towards the background;

a second at least one rear light source positioned in a lateral axis intersecting the elevated platform and being substantially perpendicular to the longitudinal axis;

at least one light shield positioned between the second at least one rear light source and the elevated platform, the at least one light shield configured to shield the elevated platform from light emitted directly from the second at least one rear light source from lighting an upper surface of the elevated platform; and wherein a top surface of the elevated platform reflects light emanating from the background such that the elevated platform appears a substantially similar color as the background and a rear edge of the elevated platform is substantially imperceptible to an image capture device positioned at the image capture position.

3. The studio arrangement of claim 2, wherein the first distance is about 4.5-5.5 times a height of the top surface of the elevated platform.

4. The studio arrangement of claim 2, wherein the top surface of the elevated platform is positioned about twenty-one inches above a floor level.

5. The studio arrangement of claim 2, wherein the elevated platform is positioned about nine feet from the background.

6. The studio arrangement of claim 2, wherein the top surface of the elevated platform further comprises a Poly (methyl methacrylate) surface.

7. The studio arrangement of claim 2, wherein the cyclorama further comprises a substantially white surface.

8. The studio arrangement of claim 2, wherein the elevated platform further comprises a reflective upper surface.

9. The studio arrangement of claim 2, wherein the first at least one rear light source and the second at least one rear light source further comprise a plurality of light sources consuming about 40 kilowatts, the plurality of light sources emitting light that is substantially evenly distributed across the background.

10. The studio arrangement of claim 2, wherein the first at least one rear light source and the second at least one rear light source further comprise a first intensity and the front light source comprises a second intensity, wherein a ratio of the first intensity to the second intensity is approximately 10:3.

11. The studio arrangement of claim 2, wherein the front light source, the first at least one rear light source and the second at least one rear light source are configured to emit light having a substantially similar color temperature.

12. The studio arrangement of claim 2, wherein the first at least one rear light source further comprises:

a first rear light source positioned between the elevated platform and the background in the longitudinal axis, the first rear light source positioned below a height of the elevated platform; and a second rear light source positioned between the elevated platform and the background in the longitudinal axis, the second rear light source positioned above a height of the elevated platform.

13. The studio arrangement of claim 12, wherein the first rear light source is further positioned on a floor beneath the elevated platform and oriented at about an upward forty-five degree angle relative to the floor.

14. The studio arrangement of claim 12, wherein the first rear light source further comprises a ten kilowatt light source.

15. The studio arrangement of claim 12, wherein the second rear light source is further positioned at a distance above the floor that is about 1.5-2.5 times the first distance and oriented at a downward forty-five degree angle relative to the floor.

16. The studio arrangement of claim 12, wherein the second rear light source further comprises a ten kilowatt light source.

17. The studio arrangement of claim 12, wherein the second at least one rear light source comprises:
- a third rear light source positioned in a lateral axis intersecting the elevated platform and being substantially perpendicular to the longitudinal axis, the third rear light source further positioned adjacent to a side of the elevated platform; and
- a fourth rear light source positioned in the lateral axis adjacent to an opposing side of the elevated platform.

18. The studio arrangement of claim 17, wherein the third rear light source and fourth rear light source are oriented at about a forty-five degree angle relative to the longitudinal axis.

19. The studio arrangement of claim 17, wherein the third rear light source and the fourth rear light source are positioned at a distance from the background that is about 0.5-1.0 times the first distance.

20. The studio arrangement of claim 17, wherein the third rear light source and fourth rear light source further comprise a first five kilowatt light source and a second five kilowatt light source.

21. The studio arrangement of claim 17, wherein the at least one light shield further comprises:
- a first light shield positioned between the third rear light source and the elevated platform, the first light shield configured to prevent light emitted directly from the third rear light source from lighting an upper surface of the elevated platform; and
- a second light shield positioned between the fourth rear light source and the elevated platform, the second light shield configured to prevent light emitted directly from the fourth rear light source from lighting the upper surface of the elevated platform.

22. The studio arrangement of claim 12, wherein the front light source further comprises a twelve kilowatt light source positioned at a distance from the elevated platform that is about two to three times the first distance, the second rear light source further oriented at about a five degree downward angle relative to a floor level.

23. The studio arrangement of claim 2, wherein the image capture position is positioned at a distance from the elevated platform that is about 2-2.5 times the first distance and at a height that is about 2-2.5 times a height of the top surface of the elevated platform, the image capture position further oriented at about a five degree upward angle relative to a floor level.

24. The studio arrangement of claim 23, wherein the image capture position further comprises an image capture device.

25. A method, comprising:
- positioning a subject on an elevated platform in a studio arrangement, the studio arrangement comprising a plurality of rear light sources positioned behind the elevated platform and aimed at a background behind the elevated platform, the background comprising a cyclorama;
- activating the plurality of rear light sources, the plurality of rear light sources comprising a plurality of light sources being substantially evenly distributed over the background;
- activating a front light source aimed at the subject, wherein an image capture position is positioned between the front light source and the elevated platform;
- initiating image capture in an image capture device positioned at the image capture position;
- shielding the subject from light directly emanating from the plurality of rear light sources onto the subject; and wherein
- a top surface of the elevated platform reflects light emanating from the background such that the elevated platform appears a substantially similar color as the background and a rear edge of the elevated platform is substantially imperceptible to the image capture device.

26. The method of claim 25, further comprising the step of configuring the image capture device with an ISO setting of 320 and an f-stop value of approximately 5.6.

27. The method of claim 25, wherein the plurality of rear light sources and the front light source further comprise a plurality of tungsten light sources configured to emit light having a color temperature of approximately 3200K.

* * * * *